US007853372B2

(12) United States Patent
Park et al.

(10) Patent No.: US 7,853,372 B2
(45) Date of Patent: Dec. 14, 2010

(54) SYSTEM, APPARATUS, AND METHOD OF PREVENTING COLLISION OF REMOTE-CONTROLLED MOBILE ROBOT

(75) Inventors: Jun-ho Park, Hwaseong-si (KR); Yeon-ho Kim, Yongin-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 992 days.

(21) Appl. No.: 11/644,980

(22) Filed: Dec. 26, 2006

(65) Prior Publication Data

US 2007/0282531 A1      Dec. 6, 2007

(30) Foreign Application Priority Data

Jun. 1, 2006   (KR) .................. 10-2006-0049395

(51) Int. Cl.
*G06F 11/30* (2006.01)
(52) U.S. Cl. .......................... 701/23; 382/103
(58) Field of Classification Search .............. 701/23, 701/28, 300–301; 382/103–108, 153–154; 348/42–51, 113–124, 135–137, 139–143, 348/152–155; 700/245, 251, 258–259
See application file for complete search history.

(56) References Cited

U.S. PATENT DOCUMENTS

| 4,905,151 | A | 2/1990 | Weiman et al. | 364/424.02 |
| 6,611,120 | B2* | 8/2003 | Song et al. | 318/568.12 |
| 6,845,297 | B2 | 1/2005 | Allard | 700/259 |
| 2006/0293786 | A1* | 12/2006 | Baba et al. | 700/245 |

FOREIGN PATENT DOCUMENTS

| JP | 6-337286 | 12/1994 |
| JP | 07-050769 | 2/1995 |
| JP | 11-353565 | 12/1999 |
| JP | 2000-342497 | 12/2000 |
| JP | 2002-029346 | 1/2002 |
| JP | 2003-330540 | 11/2003 |
| JP | 2004-056763 | 2/2004 |
| JP | 2004-127182 | 4/2004 |
| JP | 2005-056372 | 3/2005 |
| JP | 2005-258792 | 9/2005 |
| JP | 2006-039682 | 2/2006 |
| JP | 2006-099155 | 4/2006 |
| JP | 2006-107422 | 4/2006 |
| JP | 2006-113858 | 4/2006 |
| KR | 10-2002-0081511 | 10/2002 |
| KR | 2002-0081035 | 10/2002 |
| KR | 10-2004-0071999 | 8/2004 |

* cited by examiner

*Primary Examiner*—Dalena Tran
(74) *Attorney, Agent, or Firm*—Staas & Halsey LLP

(57) ABSTRACT

A system, apparatus, and method of preventing a collision of a remote-controlled mobile robot are disclosed. The system includes a mobile robot transmitting image data taken by a camera mounted on the mobile robot and moving in accordance with received control data, and a control appliance receiving and analyzing the image data, displaying the analyzed result on a screen, and transmitting the control data to the mobile robot.

22 Claims, 9 Drawing Sheets

SYSTEM, APPARATUS, AND METHOD OF PREVENTING COLLISION OF REMOTE-CONTROLLED MOBILE ROBOT

CROSS-REFERENCE TO RELATED APPLICATION

This application claims priority from Korean Patent Application No. 10-2006-0049395 filed on Jun. 1, 2006 in the Korean Intellectual Property Office, the disclosure of which is incorporated herein by reference.

BACKGROUND OF THE INVENTION

1. Field of the Invention

The present invention relates to a system, apparatus, and method of preventing a collision of a remote-controlled mobile robot with an obstacle and, more particularly, to a system, apparatus, and method of preventing such a collision of a remote-controlled mobile robot by performing color-mapping on the obstacle that may collide with the mobile robot on the screen of a control appliance which controls the mobile robot from a remote place, and generating an alarm signal before the mobile robot collides against the obstacle, so as to enable a user controlling the mobile robot at the remote to easily recognize the obstacle.

2. Description of Related Art

Generally, a mobile robot detects a current position of the mobile robot itself and a position of an obstacle by use of a camera, and performs travel and operation in accordance with the position information.

Recently, as the use field of a mobile robot has been widely and diversely extended from military and industrial uses to home use, attention is now being directed to ways in which a mobile robot finds the position of an obstacle and ways in which a user controlling the mobile robot recognizes the obstacle. Examples of such a conventional method and system are disclosed in U.S. Pat. Nos. 4,905,151 and 6,845,297.

In the conventional art, the mobile robot measures a distance between the robot and the obstacle based on the position and brightness of light which is collimated on a charge coupled device (CCD) by illuminating the light toward the front of the mobile robot, or a remote user views a head-up display of the robot and an overhead map of a user interface through a monitor to control the mobile robot from a remote place.

Image distortion of a peripheral object seen through a camera and an amount of information to be seen once through the camera may differ by a field of view (FOV) of the CCD. If the FOV of the CCD is small, it is difficult to distinguish the shape of the obstacle, and also it is difficult to inform the remote user of the information on the obstacle.

Also, it is required for an expensive distance measuring sensor is required to draw out the overhead map which can be recognized by the remote user. If the screen of the user's appliance to control the mobile robot is small, it is difficult to display the overhead map, and also it is difficult for the user to recognize the obstacle through the overhead map displayed thereon.

BRIEF SUMMARY

An aspect of the present invention provides a system, apparatus, and method of preventing collision of a remote-controlled mobile robot by color-overlapping an obstacle to be possibly collided with the mobile robot on the screen of a control appliance which controls the mobile robot from a remote place.

Another aspect of the present invention color-overlaps an obstacle to be possibly collided with a mobile robot on a screen of a control appliance which controls the mobile robot from a remote place, so that a user can effectively recognize the obstacle through the control appliance having a small screen.

Still another aspect of the present invention informs a user of information on motion of a mobile robot by displaying focus of expansion (FOE) and a traveling speed of the mobile robot on a screen of a mobile-robot control appliance as an icon.

Still another aspect of the present invention prevents a mobile robot from colliding against an obstacle by informing a user of an alarm sound before a specified time (e.g., 5 seconds) when the mobile robot approaches the obstacle.

According to an aspect of the present invention, there is provided a system for preventing collision of a remote-controlled mobile robot. The system includes a mobile robot transmitting image data taken by a camera mounted on the mobile robot and moving in accordance with received control data, and a control appliance receiving and analyzing the image data, displaying the analyzed result on a screen, and transmitting the control data to the mobile robot. The image of an obstacle that may collide with the mobile robot is color-mapped on the screen and an alarm signal causing the control appliance to emit an alarm is generated before the mobile robot collides against the obstacle.

According to another aspect of the present invention, there is provided an apparatus for preventing a collision of a remote-controlled mobile robot. The apparatus includes an image processing unit storing and comparing images of a heading direction of the mobile robot, an obstacle detecting unit detecting an obstacle positioned in the heading direction of the mobile robot to generate collision expecting information, and a color-mapping unit generating color information to be mapped on a collision expecting region of the obstacle based on the collision expecting information.

According to still another aspect of the present invention, there is provided an apparatus for preventing a collision of a remote-controlled mobile robot. The apparatus includes a color-mapping unit color-mapping a collision expecting region, against which the mobile robot is likely to collide, to be displayed on a screen, based on information received from the mobile robot, a traveling information display unit displaying traveling information of the mobile robot on the screen, based on the received information, and an alarm sound generating unit generating an alarm sound, based on the received information, before a specified collision expecting time when the mobile robot approaches a collision expected obstacle.

According to still another aspect of the present invention, there is provided a method of preventing a collision of a remote-controlled mobile robot. The method includes storing images of a heading direction taken by a camera mounted on the mobile robot at a specified time difference, and comparing the images, detecting an obstacle positioned toward a heading direction of the mobile robot to generate collision expecting information, and generating color information to be mapped on a collision expecting region of the obstacle based on the collision expecting information.

According to still another aspect of the present invention, there is provided a method of preventing a collision of a remote-controlled mobile robot. The method includes performing color-mapping on a collision expecting region, against which the mobile robot is likely to collide, to be displayed on a screen, based on information received from the mobile robot, displaying traveling information of the mobile robot on the screen, based on the received information, and generating an alarm sound to a user, based on the received information, before a specified collision expecting time when the mobile robot approaches a collision expected obstacle.

According to still other aspects of the present invention, there are provided computer-readable storage media encoded with processing instructions for causing a processor to execute the aforementioned methods.

Additional and/or other aspects and advantages of the present invention will be set forth in part in the description that follows and, in part, will be apparent from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
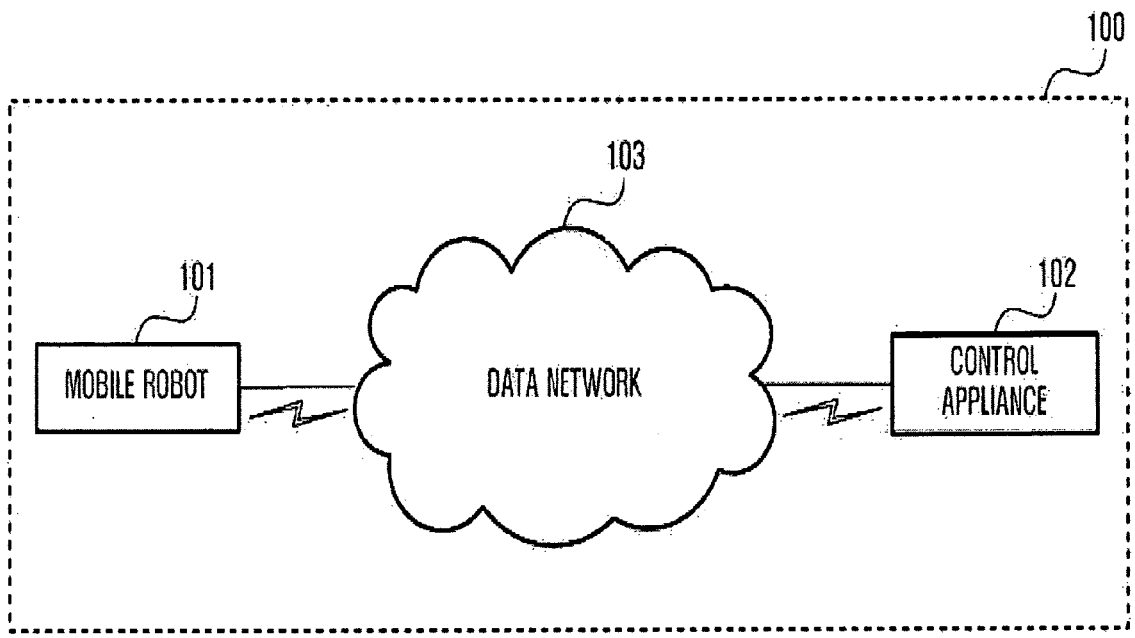
FIGS. 1A and 1B are views illustrating the structure of a collision preventing system for a remote-controlled mobile robot according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1B:
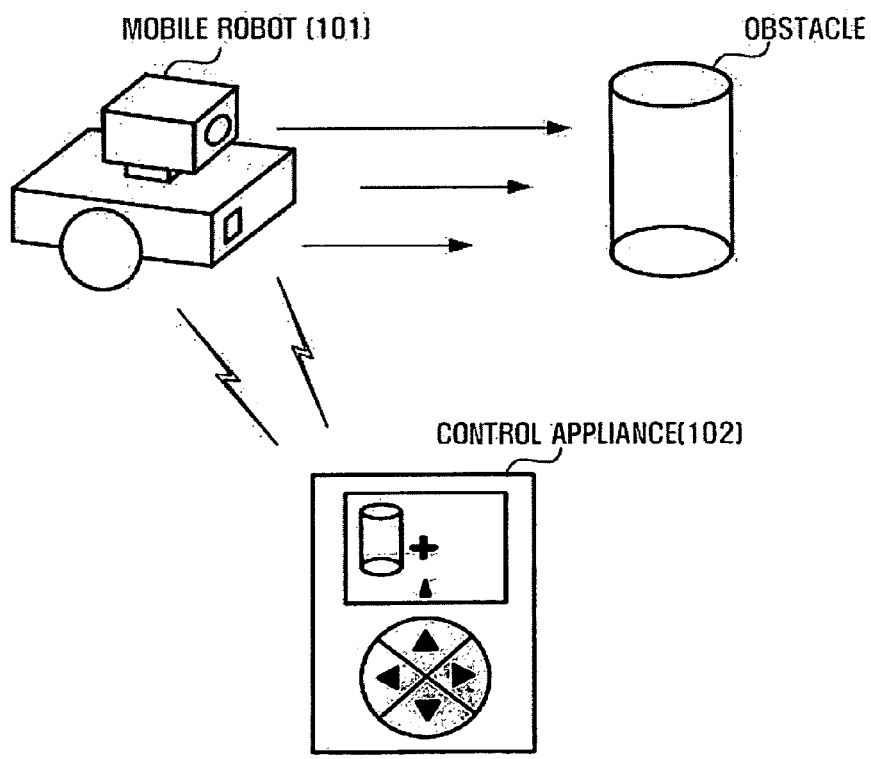

FIGS. 1A and 1B are views illustrating the structure of a collision preventing system for a remote-controlled mobile robot according to an embodiment of the present invention.

The collision preventing system 100 for a remote-controlled mobile robot according to an embodiment of the present invention includes a mobile robot 101 and a control appliance 102 controlling the mobile robot from a remote place. The mobile robot 101 and the control appliance 102 are connected to each other via a cable/wireless data communication network 103.

The mobile robot 101 transmits the image data of a heading direction and traveling information taken by a camera mounted on the mobile robot to the remote control appliance 102 via the cable/wireless data communication network 103, and the control appliance 102 (1) analyzes the image data and traveling information received from the mobile robot 101 and (2) displays the analyzed results on the screen of the control appliance 102.

The remote user can control the mobile robot 101 by referring to the image and traveling information displayed on the screen of the control appliance 102.

The control appliance 102 includes the screen displaying the image received from the mobile robot 101 and at least one direction key, such as a keypad or a button, to control the mobile robot 101. An example of the control appliance 102 may be a mobile terminal or a computer.

Figure 2:
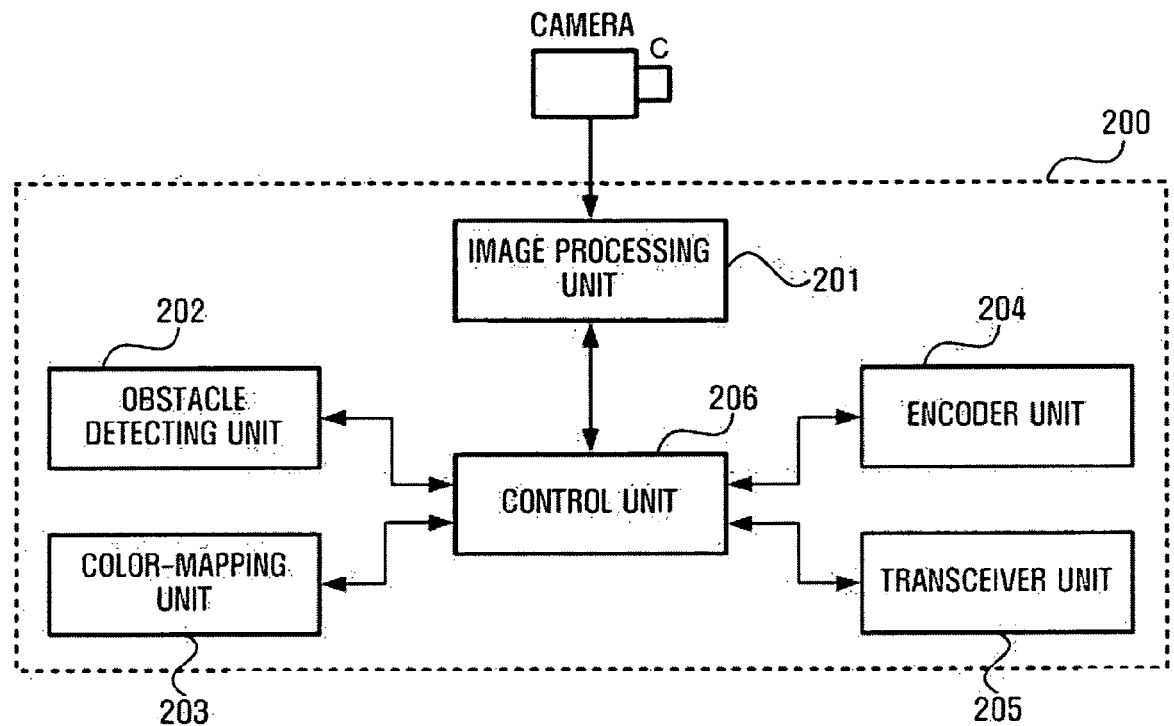
FIG. 2 is a block diagram illustrating the structure of a collision preventing apparatus (a mobile robot) for a remote-controlled mobile robot according to an embodiment of the present invention.

FIG. 2 is a block diagram illustrating the structure of a collision preventing apparatus (mobile robot) for the remote-controlled mobile robot according to an embodiment of the present invention.

Referring to FIGS. 1 and 2, the collision preventing apparatus 200 for the remote-controlled mobile robot according to an embodiment of the present invention includes an image processing unit 201 storing and comparing the images of the heading direction taken by the camera mounted on the robot at a specified time difference, an obstacle detecting unit 202 detecting an obstacle positioned in the heading direction of the mobile robot 101 to generate a collision expecting information, a color-mapping unit 203 generating color information to be mapped on a collision expecting region of the obstacle based on the collision expecting information, an encoder unit 204 detecting motion of wheels of the mobile robot 101 to generate information on a traveling speed, traveling direction, and traveling distance, a transceiver unit 205 transmitting the image data of the heading direction and the traveling information taken by the camera to the control appliance 102 and receiving control data to control the mobile robot 101 from the control appliance 102, and a control unit 206 controlling each of units 201-205.

The term "unit", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

In FIG. 2, the image processing unit 201 stores and compares the images of the heading direction taken by the camera mounted on the robot at a specified time difference.

A mobile object tracking technique to analyze the images continuously inputted at a specified (constant) time difference (interval) and to estimate the motion of the target object is of interest in the field of computer vision and the field of mobile robots using the same.

Since the image processing results of a current frame are repeatedly used when a next frame is processed, this performs analysis of the motion of images continuously inputted or dynamic object.

In the process of detecting the motion information based on the feature difference obtained from plural image processes, a moving direction and speed of the target object are important feature values, and the feature values represented by a vector is called as optical flow. Optical flow is the apparent visual motion experienced as a result of movement.

Consequently, it is possible to estimate the motion of the target object by calculating the optical flow on each point of the target object.

The image processing unit 201 stores the images of the heading direction taken by the camera mounted on the robot 101 in a memory (not shown) at a specified time difference to compare the images, and receives the traveling speed and traveling direction of the mobile robot 101 from the encoder 204 to calculate the optical flow.

3-dimensional motion of the mobile robot 101 causes 2-dimensional moving displacement. If the mobile robot 101 moves, the motion of the mobile robot 101 is regarded as the optical flow from one point positioned at an infinite distance.

An optical flow f=(u, v) at a feature point p=(x, y) in the 2-dimensional image may be calculated by Equation 1 below.

$$(\hat{u}, \hat{v}) = \underset{(u,v)}{\operatorname{argmin}} \sum_{w_x=-W}^{W} \sum_{w_y=-W}^{W} (I_1(x+w_x, y+w_y) - I_2(x+w_x+u, y+w_y+v))$$ [Equation 1]

In Equation 1, $I_1$ and $I_2$ are camera images obtained at a time difference, $w_x$ and $w_y$ are a deviation in x- and y-direction at the feature point (x, y), and W is the maximum dimension of the deviation.

Also, the image processing unit 201 calculates the FOE (focus of expansion).

The FOE is one point positioned at the infinite distance mentioned when the optical flow is described above, and a certain point in a two-dimensional image moves along a straight line from the FOE to the point. From the FOE, a specific direction of travel can be ascertained.

The mobile robot 101 moving independently is coupled to the FOE associated with the motion direction of the mobile robot itself.

Figure 3:
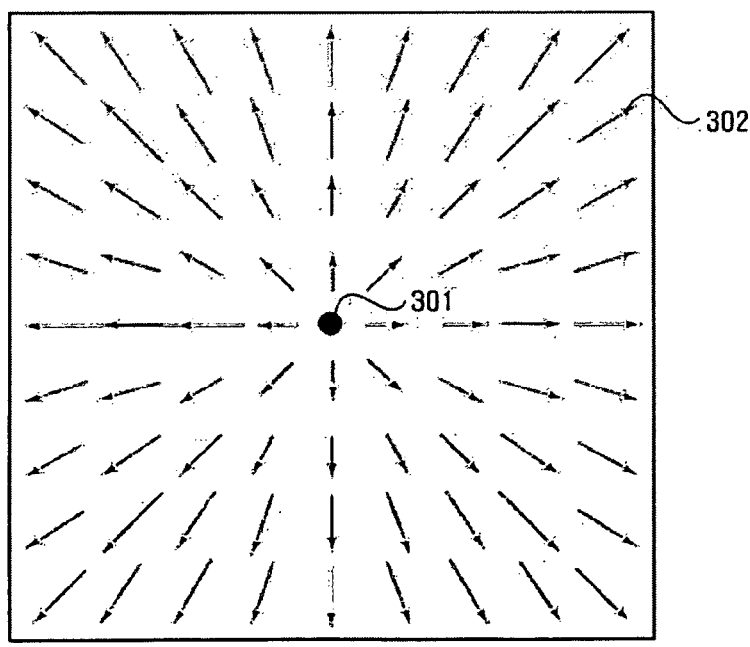
FIG. 3 is a view illustrating a typical pattern of optical flow which is an embodiment of optical flow.

FIG. 3 is a view illustrating a typical pattern of optical flow which is an example of the optical flow.

Referring to FIGS. 1 and 3, when it is presumed that the mobile robot 101 moves forward without turning toward a left/right direction, the mobile robot 101 approaches the screen shown in FIG. 3.

Thus, an arrow 302 expressing the optical flow points toward the perimeter of the screen from one point 301, which is the FOE.

By contrast, if the mobile robot 101 moves away from the screen shown in FIG. 3, the arrows expressing the optical flow would originate from an unseen virtual FOE point behind the viewing user and point in a direction opposite to that shown in FIG. 3.

The FOE serves as a major role of associating the motion of a 2-dimensional image with a 3-dimensional actual image. The point P=($X_0$, $Y_0$) which is the FOE in the 2-dimensional image may be calculated by Equation Set 2 below.

$$(X_0, Y_0) = \underset{(x,y)}{\operatorname{argmin}} S(x, y)$$ [Equation Set 2]

$$S(x, y) = \Psi(u(x, y), v(x, y)) \cdot \sum_{m=-w}^{w} \sum_{n=-w}^{w}$$

$$[[F(m, n) - \alpha(u(x+m, y+n), v(x+m, y+n))]^2 \cdot$$

$$\Phi(u(x+m, y+n), v(x+m, y+n))]$$

$$F(m, n) = \arctan \frac{n}{m}$$

$$\alpha(u(x, y), v(x, y)) = \arctan \frac{v(x, y)}{u(x, y)}$$

$$\Phi(u(x, y), v(x, y)) = \begin{cases} 1 & u(x, y)^2 + v(x, y)^2 \geq t^2 \\ 0 & \text{otherwise} \end{cases}$$

$$\Psi(u(x, y), v(x, y)) =$$

$$\left( \sum_{m=-w}^{w} \sum_{n=-w}^{w} \Phi(u(x+m, y+n), v(x+m, y+n)) \right)^{-1}$$

In Equation Set 2, m and n are a deviation in x- and y-direction at (x, y), and W is the maximum dimension of the deviation.

Φ is the number of points having a dimension of a vector (u, v) lager than t, and S is the total sum of direction angles of these vectors. Consequently, a center value in a region, in which all the vectors are symmetrical, indicates the FOE.

In the collision preventing apparatus 200 for the remote-controlled mobile robot, the obstacle detecting unit 202 detects the obstacle positioned in the heading direction of the mobile robot 101 to generate the collision expecting information.

Herein, the collision expecting information includes information on the traveling speed and direction of the mobile robot 101, information on a collision expecting region where the mobile robot 101 is likely to collide against the obstacle positioned in the heading direction, and information on an alarm signal which enables the control appliance 102 controlling the mobile robot 101 to generate an alarm sound before a specified collision expecting time prior to the collision of the mobile robot against the obstacle.

In this instance, the time when the alarm signal information to generate the alarm sound is transmitted to the control appliance 102 controlling the mobile robot 101 may be set by the user.

For example, if the user sets the time to 5 seconds, the obstacle detecting unit 202 of the mobile robot 101 calculates the currently traveling speed of the mobile robot 101 and the distance between the mobile robot and the obstacle positioned in the heading direction, so that the control appliance 102 controlling the mobile robot generates the alarm sound before 5 seconds prior to the collision of the mobile robot 101 against the obstacle.

The obstacle detecting unit 202 derives a TOC (time of contact) T from Equation 3 below so as to calculate the collision expecting region wherein the mobile robot 101 is likely to collide against the obstacle positioned in the heading direction.

$$y = \frac{fY}{Z}$$ [Equation Set 3]

-continued $$\dot{y} = f\frac{\dot{Y}}{Z} - fY\left(\frac{\dot{Z}}{Z^2}\right)$$

$$\dot{y} = -y\left(\frac{\dot{Z}}{Z^2}\right)$$

$$\frac{y}{\dot{y}} = -\frac{Z}{\dot{Z}} = \tau$$

In Equation Set 3, f is a focal length of a camera, (X, Y, Z) are spatial 3-dimensional coordinate values, (Ẋ,Ẏ,Ż) are 3-dimensional velocity components, (x, y) are spatial 2-dimensional coordinate values, (ẋ,ẏ) are 2-dimensional velocity components, and T is TOC.

Also, the obstacle detecting unit 202 generates information to display a speed dimension and heading direction of the mobile robot 101 on the screen of the control appliance 102 based on the information on the traveling speed and traveling direction of the mobile robot 101 outputted from the encoder unit 204 and the FOE calculated by the image processing unit 201, and transmits the information to the transceiver unit 205 via the control unit 206.

The color-mapping unit 203 generates the color information to be mapped on the collision expecting region of the obstacle based on the collision expecting information.

The color information to be mapped on the collision expecting region of the obstacle is expressed by a dot of a determined color in accordance with the TOC value calculated by the obstacle detecting unit 202.

If the TOC value derived from Equation 3 is low, the dot of the color is thickened. Conversely, if the TOC value is high, the dot of the color is thinned. That is, the tone of the color to be mapped on the collision expecting region is adjusted in accordance with the TOC value, and the information is transmitted to the transceiver unit 205 via the control unit 206.

Figure 4:
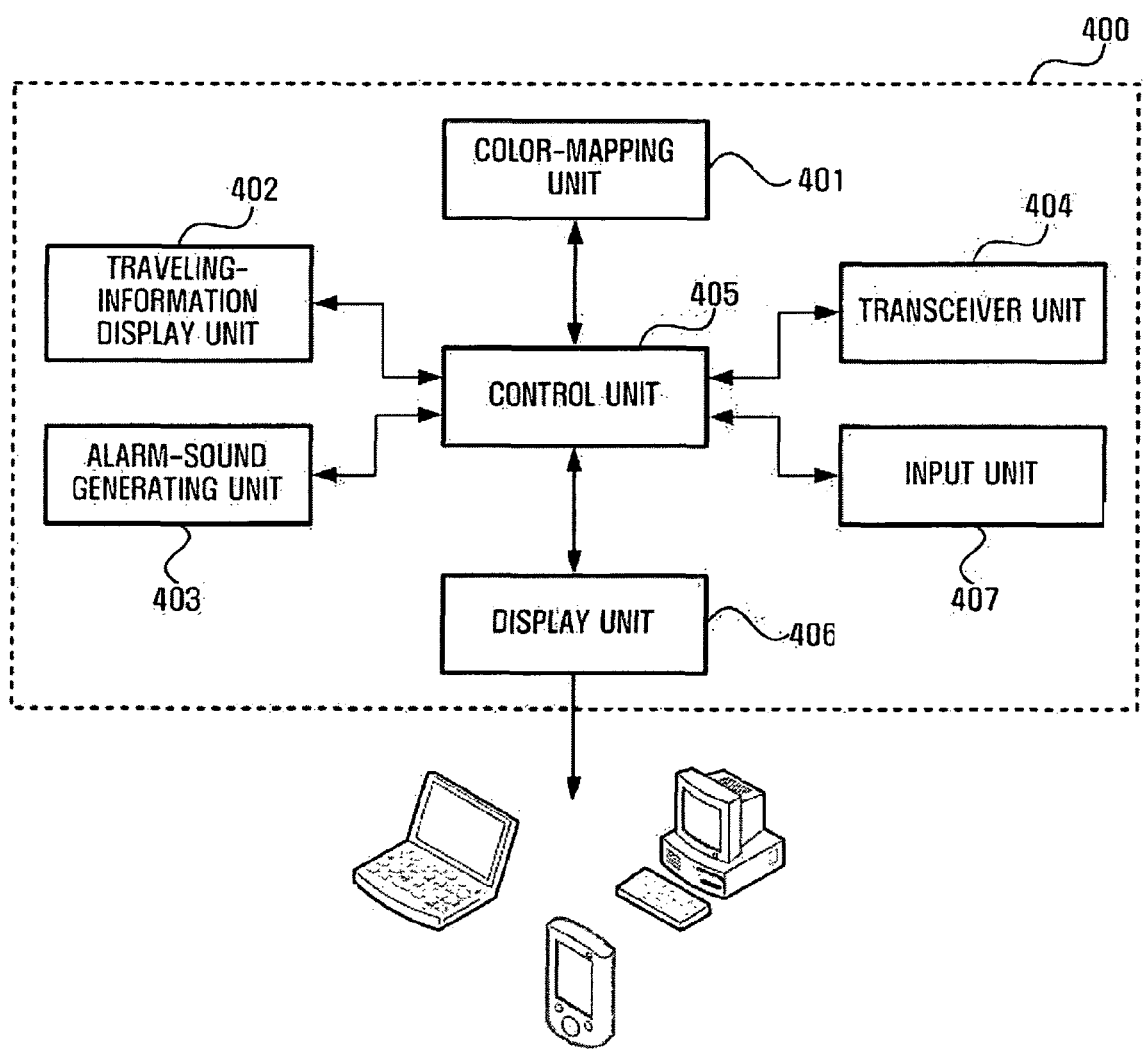
FIG. 4 is a block diagram illustrating the structure of a collision preventing apparatus (a control appliance) for a remote-controlled mobile robot according to another embodiment of the present invention.

FIG. 4 is a block diagram illustrating the structure of the collision preventing apparatus (the control appliance) for the remote-controlled mobile robot according to another embodiment of the present invention.

Referring to FIGS. 1 and 4, the collision preventing apparatus 400 for the remote-controlled mobile robot according to an embodiment of the present invention includes a color-mapping unit 401 color-mapping a collision expecting region of the obstacle, against which the mobile robot is likely to collide, to be displayed on the screen, based on the information received from the mobile robot, a traveling information display unit 402 displaying traveling information of the mobile robot on the screen, based on the received information, an alarm sound generating unit 403 generating an alarm sound to the user, based on the received information, before a specified collision expecting time prior to the collision of the mobile robot against the obstacle, a transceiver unit 404 receiving information on the mobile robot 101 to be displayed on the screen and transmitting information to control the mobile robot 101 to the mobile robot 101, a control unit 405 analyzing the information received from the transceiver unit 404 to control each unit of the apparatus 400, a display unit 406 displaying the corresponding information on the screen, and an input unit 407 having a direction key, such as a keypad or a button, to control the direction of the mobile robot 101.

The control appliance 102 controlling the mobile robot 101 may be used as the collision preventing apparatus 400 for the remote-controlled mobile robot according to another embodiment of the present invention, as shown in FIG. 1B.

The collision preventing apparatus 400 for the remote-controlled mobile robot receives the information to be displayed on the screen from the mobile robot 101 via the transceiver unit 404, and the control unit 405 analyzes the received information to control each unit.

Herein, the information received from the mobile robot 101 includes the image data of the heading direction of the mobile robot, an FOE, the traveling speed and traveling direction of the mobile robot 101, the information on the collision alarm sound to the obstacle positioned forward the heading direction of the mobile robot, and the color information to be mapped on the collision expecting region of the obstacle.

In the collision preventing apparatus 400 for the remote-controlled mobile robot, the traveling information display unit 402 displays FOE of the mobile robot, and displays the speed dimension and heading direction of the mobile robot as icons and optical flow.

The color-mapping unit 401 maps the color-mapping information relating to TOC on the obstacle displayed on the screen, so as to enable the user to easily recognize the obstacle through the control appliance having the small screen.

Also, the alarm sound generating unit 403 generates the alarm sound to the user, before the specified time (e.g., 5 seconds) prior to the collision of the mobile robot 101 against the obstacle, so as to enable the user to prevent the collision of the mobile robot 101 against the obstacle in advance.

Because of the color-mapping of the contactable obstacle displayed on the screen of the control appliance 102 and the generation of the alarm sound in advance, the user can more easily recognize the obstacle positioned in the heading direction of the mobile robot 101, and transmits the control data controlling the mobile robot 101 by manipulating the direction key, such as a keypad or a button, which is the input unit 407 provided on the control appliance 102, to the remote mobile robot 101 via the transceiver unit 404.

Figure 5:
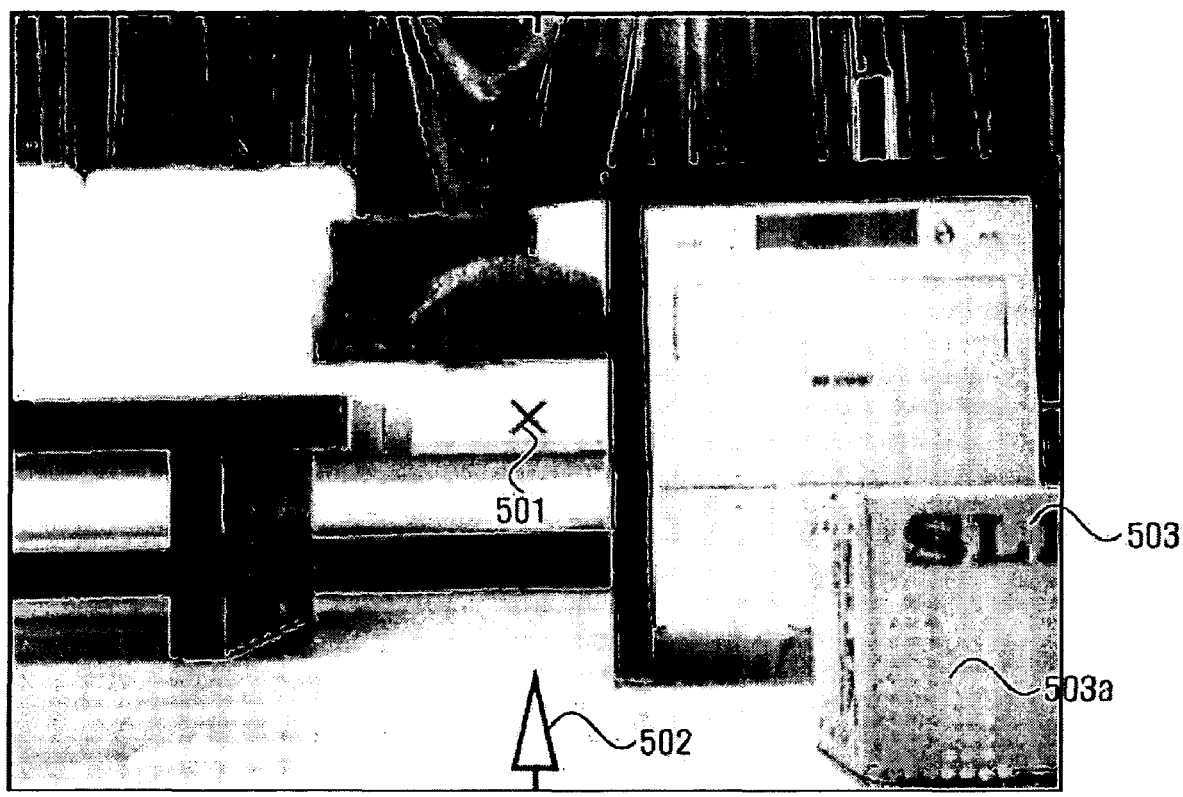
FIG. 5 is a view illustrating a screen of a control appliance, on which an image expressing a heading direction of a mobile robot according to an embodiment of the present invention and traveling information of the mobile robot are displayed.

FIG. 5 is a view illustrating the screen of the control appliance, on which an image expressing the heading direction of the mobile robot according to an embodiment of the present invention and the traveling information of the mobile robot are displayed.

The FOE 501 is represented by an X-shaped icon, and the speed dimension and heading direction of the mobile robot is represented by a triangular icon 502.

The angle of the triangular icon 502 is varied in accordance with the heading direction of the mobile robot 101, and the dimension (size) of the triangular icon 502 is varied depending upon the speed of the mobile robot 101.

That is, if the speed of the mobile robot is high, the triangular icon is lengthened. Conversely, if the speed of the mobile robot is low, the triangular icon is shortened. The user controlling the mobile robot 101 at the remote can easily recognize the traveling speed and heading direction of the mobile robot 101 by watching the dimension of the triangular icon 502.

The displayed icon of the FOE 501 is not limited to the X-shaped icon, and may be represented by other shapes such as a cross or a star.

The icon 502 is not limited to the triangular shape, and the icon may be shaped so that the user can easily recognize the direction and speed of the mobile robot 101 based on a length of the icon.

Also, a collision expecting region 503a of the obstacle 503 positioned in the heading direction of the mobile robot is color-mapped. Therefore, the user can effectively recognize the obstacle 503 against which the mobile robot will collide, through the control appliance having a small screen.

Figure 6A:
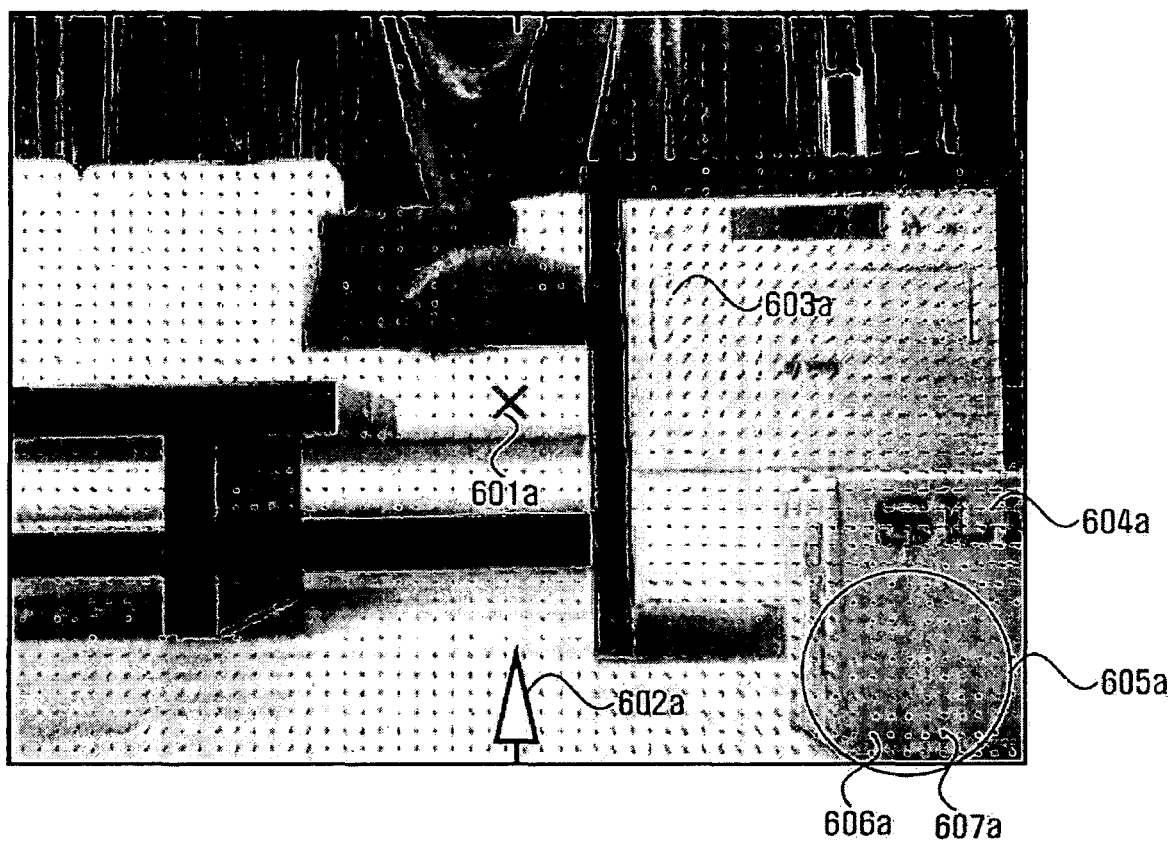
FIGS. 6A through 6C are views illustrating a screen of a control appliance, on which an image expressing a heading direction of a mobile robot according to another embodiment of the present invention and traveling information of the mobile robot are displayed.
Figure 6B:
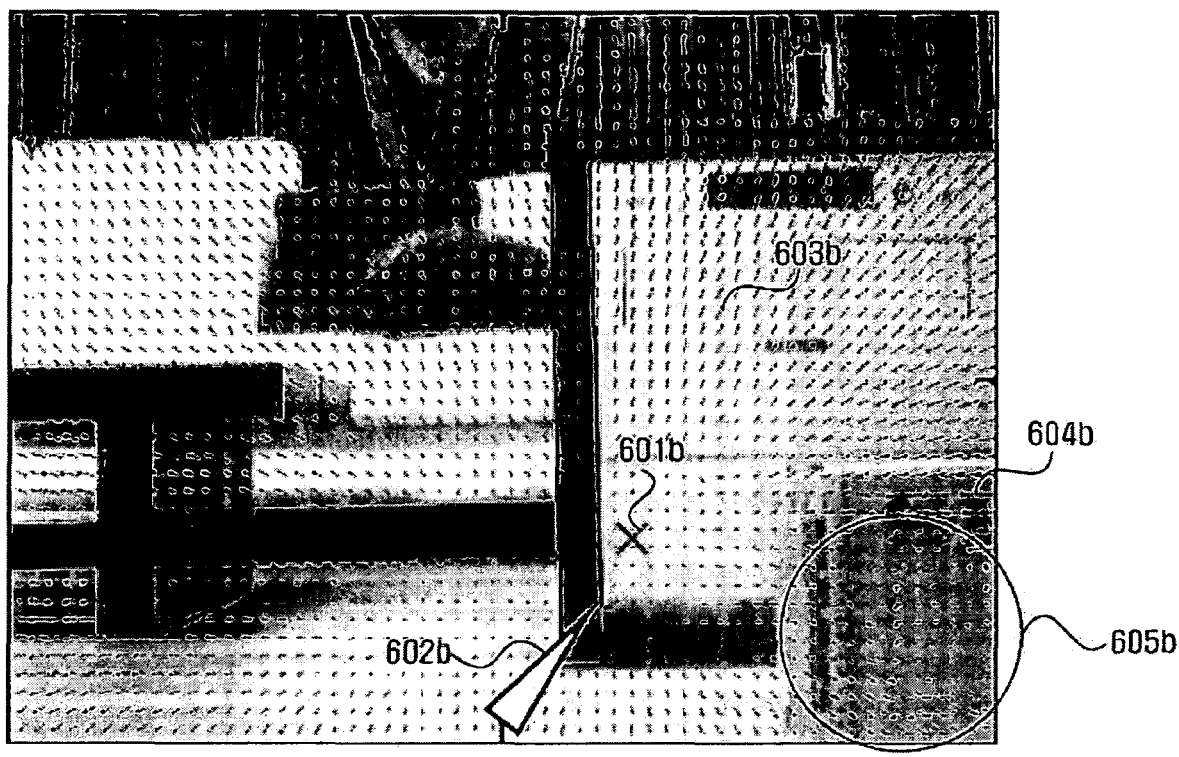
Figure 6C:
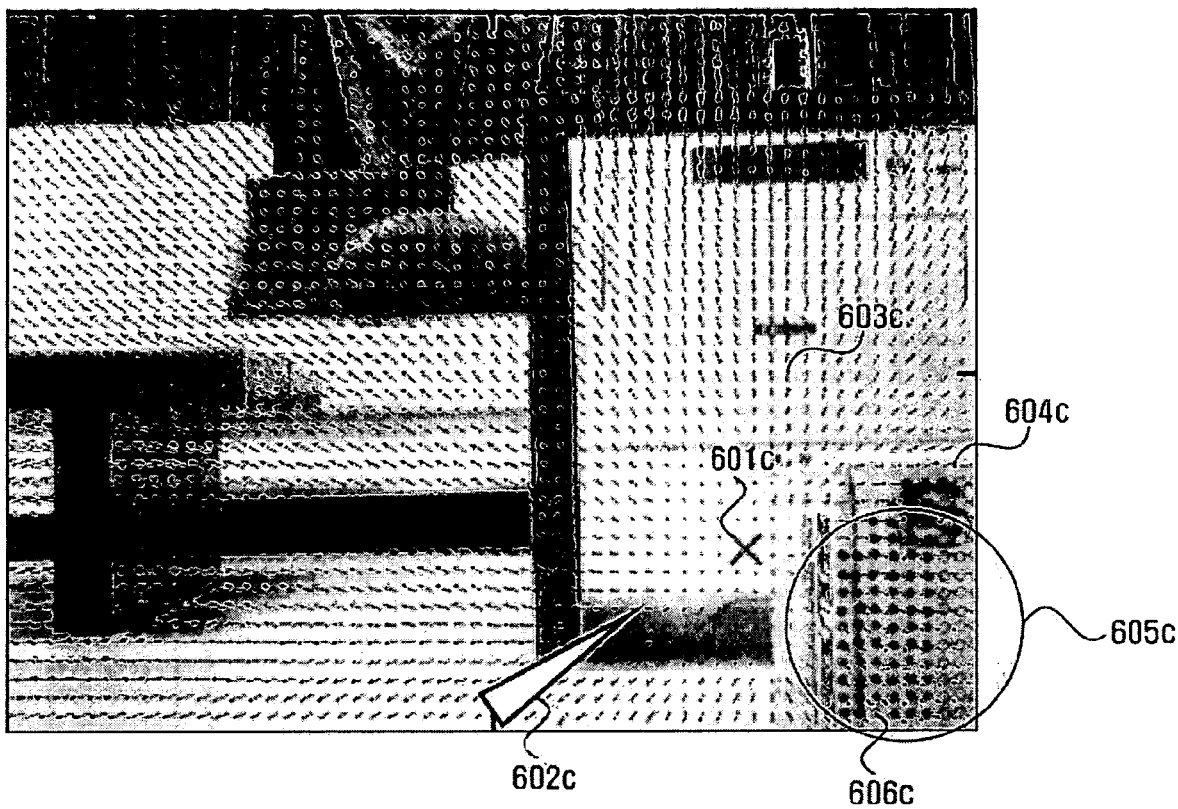

FIGS. 6A through 6C are views illustrating the screen of the control appliance, on which the image expressing the heading direction of the mobile robot according to another embodiment of the present invention and the traveling information of the mobile robot are displayed.

FIG. 6A shows the state in which the mobile robot not turning left and right but moving forward is displayed on the screen of the control appliance.

An FOE 601a is displayed on the center of the screen, and a triangular icon 602a expressing the heading direction and speed of the mobile robot is displayed on the lower portion of the screen.

Since the mobile robot does not turn left and right but travels forward, the shape of an optical flow 603a extends radially from the FOE 601a, and an arrow expressing the optical flow is represented by a small shape.

A collision expecting region 605a of the obstacle 604a is color-mapped, and the collision expecting region 605a is shown by a dark color 606a and a relatively light color 607a according to a collision expecting possibility.

FIG. 6B shows the state in which the mobile robot shown in FIG. 6A turning toward a right direction and moving forward is displayed on the screen of the control appliance.

An FOE 602b moves toward the right direction relative to the FOE 601a in FIG. 6A, and a triangular icon 602b expressing the heading direction and speed of the mobile robot according to the angle turned toward the right direction is displayed on the lower portion of the screen.

The shape of an optical flow 603b extends radially from the FOE 602b, and a color-mapped collision expecting region 605b of the obstacle 604b is represented by a wide area relative to the collision expecting region 605a in FIG. 6A.

This means that the mobile robot 101 approaches the obstacle 604b that much.

FIG. 6C shows the state in which the mobile robot turning toward a right direction more than that shown in FIG. 6B and moving forward at higher speed is displayed on the screen of the control appliance.

An FOE 603c is more close to an obstacle 604c, and a triangular icon 602c expressing the heading direction and speed of the mobile robot according to the angle turned toward the right direction is displayed on the lower portion of the screen.

Since the mobile robot moves forward at speed faster than that in FIG. 6B, it can be seen the triangular icon 603c longer than the triangular icon 602b shown in FIG. 6B. The optical flow 603c extends radially from the FOE 602b, and an arrow expressing the optical flow 603c is relatively longer than that shown in FIG. 6B.

Also, a collision expecting region 605c of the obstacle 604c is represented by a wide area relative to the collision expecting region 605b in FIG. 6B.

Figure 7:
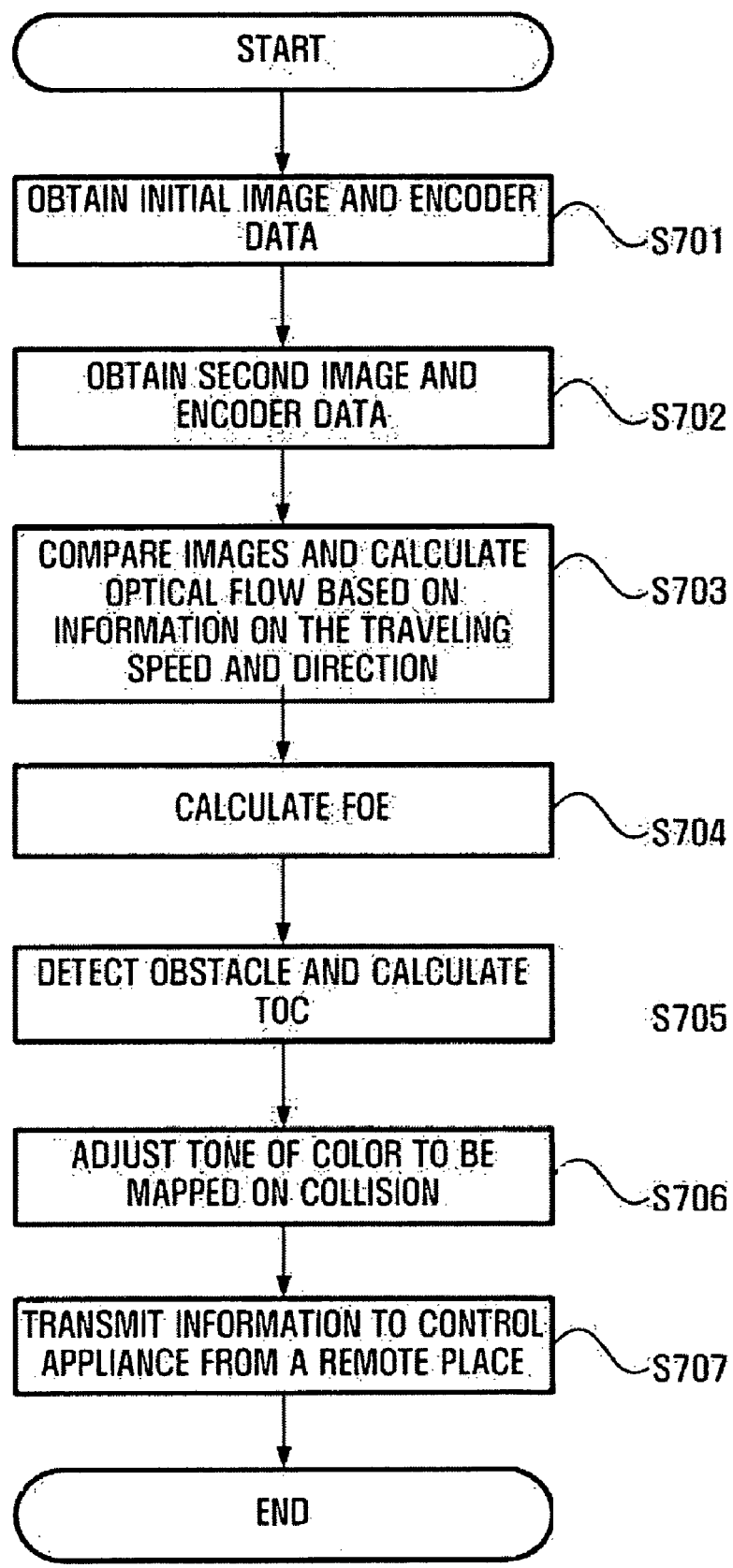
FIG. 7 is a flowchart illustrating the method of preventing collision of a remote-controlled mobile robot according to an embodiment of the present invention.

FIG. 7 is a flowchart illustrating the method of preventing collision of a remote-controlled mobile robot according to an embodiment of the present invention, and the method will be described with reference to the apparatus 200 shown in FIG. 2, for ease of explanation only.

Referring to FIGS. 1, 2, and 7, when the mobile robot 101 starts to move from a stop (rest) state, the image of the traveling direction taken by the camera mounted on the mobile robot 101 is transmitted to the image processing unit 201 via the control unit 206, and the encoder unit 204 detects the motion of the wheels of the mobile robot 101 to transmit the information on the traveling speed and the direction to the image processing unit 201 via the control unit 206, in operation S701.

After operation S701, the second image of the traveling direction taken by the camera mounted on the mobile robot 101 at the specified time difference is transmitted to the image processing unit 201 via the control unit 206, and the encoder unit 204 detects the motion of the wheels of the mobile robot 101 to transmit the information on the traveling speed and the direction, at the point of time when the second image is transmitted, to the image processing unit 201 via the control unit 206, in operation S702.

The image processing unit 201 stores the images of the traveling direction inputted through operations S701 and S702 in a memory (not shown), and calculates and compares the optical flow based on the information on the traveling speed and direction, in operation S703.

After operation S703, the image processing unit 201 calculates the FOE, in operation S704.

Then, the obstacle detecting unit 202 detects the obstacle positioned in the heading direction of the mobile robot 101, and generates the collision alarm sound and calculates the TOC, in operation S705.

After operation S705, the color-mapping unit 203 adjusts the tone of the color to be mapped on the collision expecting region based on the calculated TOC, in operation S706.

The information obtained through operations S701 through S706 is transmitted to the transceiver unit 205 via the control unit 206, and the transceiver unit 205 transmits the corresponding information to the control appliance 102 from a remote place, in operation S707.

Figure 8:
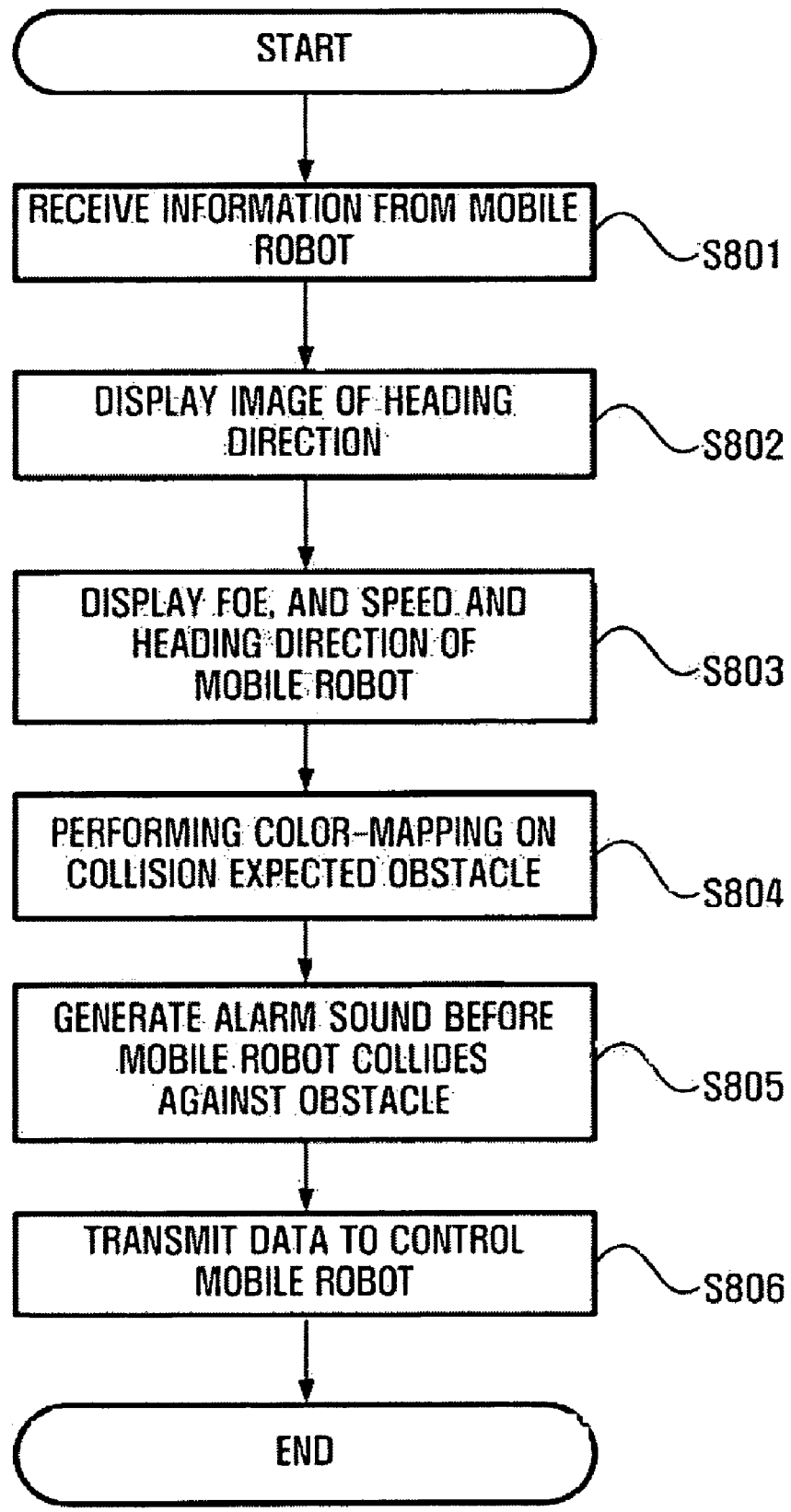
FIG. 8 is a flowchart illustrating the method of preventing collision of a remote-controlled mobile robot according to another embodiment of the present invention.

FIG. 8 is a flowchart illustrating the method of preventing collision of the remote-controlled mobile robot according to another embodiment of the present invention, and the method will now be described with reference to the apparatus 400 shown in FIG. 4, for ease of explanation only.

Referring to FIGS. 1, 4, and 8, the transceiver unit 404 receives the information from the mobile robot 101 at a remote place, and transmits the information to the control unit 405, in operation S801.

The control unit 405 analyzes the received information, and displays the image of the heading direction on the screen through the display unit 406, in operation S802. The FOE and the speed and heading direction of the mobile robot 101 are displayed as the icon and the optical flow through the traveling information display unit 402, in operation S803.

After operation S803, the color-mapping unit 401 receives the color information to be mapped on the collision expected obstacle from the control unit 405, and adjusts the tone of color determined according to the TOC value, in operation S804.

Then, the alarm sound generating unit 403 generates the alarm sound before a specified collision expecting time (second) prior to the collision of the mobile robot 101 against the obstacle through the information on the alarm sound received from the control unit 405, in operation S805.

After operation S805, the user transmits the data controlling the direction of the mobile robot by use of the direction key of the control appliance to the mobile robot 101 at a remote place via the transceiver unit 404, so as to prevent the mobile robot from colliding against the obstacle, in operation S806.

The system, apparatus, and method of preventing the collision of the remote-controlled mobile robot according to the above-described embodiments have the following advantages.

A collision of the mobile robot can be prevented by color-overlapping the obstacle that may collide with the mobile robot on the screen of the control appliance which controls the mobile robot from a remote place, so that the user can effectively recognize the obstacle through the control appliance having the small screen.

A transfer of the information on motion of the mobile robot to the user can be facilitated by representing the heading direction and traveling speed of the mobile robot by the icon and vector on the screen of the control appliance.

A collision of the mobile robot against the obstacle can be prevented by informing the user of the collision through the alarm sound before the mobile robot collides against the obstacle.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A system for preventing a collision of a remote-controlled mobile robot, comprising:
    a mobile robot transmitting image data taken by a camera mounted on the mobile robot and moving in accordance with received control data; and
    a control appliance receiving and analyzing the image data, displaying the analyzed result on a screen, and transmitting the control data to the mobile robot,
    wherein an image of an obstacle that may collide with the mobile robot is color-mapped on the screen and an alarm signal causing the control appliance to emit an alarm is generated before the mobile robot collides against the obstacle, and
    wherein a collision expecting region color-mapped on the screen is adjusted to different colors according to a time of contact (TOC) of the mobile robot with respect to the obstacle positioned in the heading direction of the mobile robot.

2. The system of claim 1, wherein the mobile robot and the control appliance transmit and receive data via a data communication network.

3. An apparatus for preventing a collision of a remote-controlled mobile robot, comprising:
    an image processing unit storing and comparing images of a heading direction of the mobile robot;
    an obstacle detecting unit detecting an obstacle positioned in the heading direction of the mobile robot to generate collision expecting information, calculating a time of contact (TOC) of the mobile robot with respect to the obstacle positioned in the heading direction of the mobile robot and calculating a collision expecting region where the mobile robot is likely to collide against the obstacle positioned based on the TOC; and
    a color-mapping unit generating color information to be mapped on the collision expecting region of the obstacle based on the collision expecting information,
    wherein the color-mapping unit adjusts a tone of color to be mapped on the collision expecting region in accordance with the TOC value.

4. The apparatus of claim 3, further comprising an encoder unit generating information on a traveling speed, a traveling direction, and a traveling distance of the mobile robot.

5. The apparatus of claim 3, further comprising a transceiver unit transmitting, to a control appliance controlling the mobile robot, at least one of image information on the heading direction, the collision expecting information, and the color information to be mapped on the collision expecting region and receiving control data to control the mobile robot from the control appliance.

6. The apparatus of claim 3, wherein the image processing unit calculates an optical flow usable to determine the heading direction.

7. The apparatus of claim 6, wherein the image processing unit calculates a focus of expansion (FOE) based on the calculated optical flow.

8. The apparatus of claim 3, wherein the obstacle detecting unit transmits an alarm signal to a control appliance controlling the mobile robot before a specified collision expecting time when the mobile approaches the obstacle.

9. The apparatus of claim 8, wherein a point of time when the alarm signal is transmitted to the control appliance is settable by a user.

10. An apparatus for preventing a collision of a remote-controlled mobile robot, comprising:
    a color-mapping unit color-mapping a collision expecting region of an obstacle, against which the mobile robot is likely to collide, to be displayed on a screen, based on information received from the mobile robot;
    a traveling information display unit displaying traveling information of the mobile robot on the screen, based on the received information; and
    an alarm sound generating unit generating an alarm sound, based on the received information, before a specified collision expecting time when the mobile robot the obstacle,
    wherein the collision expecting region color-mapped on the screen is adjusted to different colors according to a time of contact (TOC) of the mobile robot with respect to the obstacle positioned in a heading direction of the mobile robot.

11. The apparatus of claim 10, wherein the information received from the mobile robot includes image data of the heading direction of the mobile robot, collision expecting information for the obstacle positioned in the heading direction of the mobile robot, and color information to be mapped on the collision expecting region.

12. The apparatus of claim 10, wherein the traveling information display unit displays a focus of expansion (FOE) of the mobile robot, and displays a speed dimension and a heading direction of the mobile robot as an icon and optical flow.

13. The apparatus of claim 10, wherein the collision expecting information includes information on the alarm sound cautioning of a collision before the mobile robot collides against the obstacle.

14. A method of preventing a collision of a remote-controlled mobile robot, comprising:
    (a) storing images of a heading direction taken by a camera mounted on the mobile robot at a specified time difference, and comparing the images;
    (b) detecting an obstacle positioned in a heading direction of the mobile robot to generate collision expecting information, calculating a time of contact (TOC) of the mobile robot with respect to the obstacle positioned in the heading direction of the mobile robot, calculating a collision expecting region where the mobile robot is likely to collide against the obstacle positioned based on the TOC; and
    (c) generating color information to be mapped on a collision expecting region of the obstacle based on the collision expecting information, a tone of color to be mapped on the collision expecting region being adjusted in accordance with a value of the calculated TOC.

15. The method of claim 14, further comprising detecting motion of a wheel of the mobile robot to obtain information on a traveling speed and a traveling distance of the mobile robot.

16. The method of claim 14, wherein an optical flow usable to determine the heading direction is calculated in operation (a).

17. The method of claim 16, wherein a focus of expansion (FOE) based on the calculated optical flow is calculated in operation (a).

18. The method of claim 14, wherein an alarm signal is transmitted to a control appliance controlling the mobile robot before a specified collision expecting time when the mobile approaches the obstacle, in operation (b).

19. A non-transitory computer-readable storage medium encoded with processing instructions for causing a processor to execute the method of claim 14.

20. A method of preventing a collision of a remote-controlled mobile robot, comprising:
- color-mapping a collision expecting region of an obstacle, against which the mobile robot is likely to collide, to be displayed on a screen, based on information received from the mobile robot, the color-mapped collision expecting region being adjusted to different colors according to a time of contact (TOC) of the mobile robot with respect to the obstacle positioned in the heading direction of the mobile robot;
- displaying traveling information of the mobile robot on the screen, based on the received information; and
- generating an alarm sound to a user, based on the received information, before a specified collision expecting time when the mobile robot approaches a collision expected obstacle.

21. The method of claim 20, wherein the displaying displays a focus of expansion (FOE) of the mobile robot and displays a speed dimension and a heading direction of the mobile robot as an icon and optical flow.

22. A non-transitory computer-readable storage medium encoded with processing instructions for causing a processor to execute the method of claim 20.

* * * * *